(12) United States Patent
Marcovici

(10) Patent No.: US 8,624,197 B2
(45) Date of Patent: Jan. 7, 2014

(54) FLAT PANEL DETECTOR INCORPORATING SILK LAYER(S)

(75) Inventor: Sorin Marcovici, Lexington, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 13/882,105

(22) PCT Filed: Oct. 28, 2010

(86) PCT No.: PCT/US2010/054415
§ 371 (c)(1),
(2), (4) Date: Apr. 26, 2013

(87) PCT Pub. No.: WO2012/057759
PCT Pub. Date: May 3, 2012

(65) Prior Publication Data
US 2013/0214170 A1 Aug. 22, 2013

(51) Int. Cl.
*G01T 1/24* (2006.01)
*H04N 5/32* (2006.01)

(52) U.S. Cl.
USPC .................................. 250/370.09

(58) Field of Classification Search
USPC ........................ 250/370.08, 370.09
See application file for complete search history.

(56) References Cited

U.S. PATENT DOCUMENTS

| | | | |
|---|---|---|---|
| 3,202,820 A | 8/1965 | Norton et al. | |
| 7,687,792 B2 | 3/2010 | Rowlands et al. | |

FOREIGN PATENT DOCUMENTS

| | | |
|---|---|---|
| CH | 331022 | 6/1958 |
| WO | 2008085904 A1 | 7/2008 |

OTHER PUBLICATIONS

Int. Preliminary Report on Patentability cited in PCT Application No. PCT/US2010/054415 dated Apr. 30, 2013, 8 pgs.
"The optimal optical readout for the x-ray light valve—Document scanners", P. Oakham, Robert D. MacDougall and J.A. Rowlands, Dec. 2008, Medical Physics, Radiation Imaging Physics, vol. 35, Issue 12, pp. 5672-5683.
"The x-ray light valve: A low-cost, digital radiographic imaging system—Spatial resolution", Robert D. MacDougall, Ivaylo Koprinarov and J.A. Rowlands, Sep. 2008, Medical Physics, Radiation Imaging Physics, vol. 35, Issue 9, pp. 4216-4227.
"The x-ray light valve: A potentially low-cost, digital radiographic imaging system—a liquid crystal cell design for chest radiography", Timothy C. Szeto, Christie Ann Webster, Ivaylo Koprinarov and J.A. Rowlands, Mar. 2008, Medical Physics, Radiation Imaging Physics, vol. 35, Issue 3, pp. 959-967.
"The x-ray light valve: A low-cost digital radiographic imaging system", Ivaylo Koprinarov, Christie Ann Webster, Robert D. MacDougall and A.J. Rowlands, Dec. 2007, Medical Physics, Radiation Imaging Physics, vol. 34, Issue 12, pp. 4609-4611.
International Search Report cited in related application No. PCT/US2010/054415 dated Jul. 12, 2011.
Tousignant 0 et al: "A-Se Flat Panel Detectors for Medical Applications", Proceedings of the 2007 IEEE Sensors Applications Symposium, IEEE—Piscataway, NJ, USA, Feb. 1, 2007, pp. 1-5.
Kim Dae-Hyeong et al: "Silicon electronics on silk as a path to bioresorbable, implantable devices", Applied Physics Letters, AIP, American Institute of Physics, Melville, NY, US, vol. 95, No. 13, Sep. 29, 2009, pp. 1-3.

*Primary Examiner* — Casey Bryant
(74) *Attorney, Agent, or Firm* — Cooper Legal Group LLC

(57) ABSTRACT

One or more techniques and/or systems described herein implement, among other things, a flat panel detector component for detecting actinic and non-actinic radiation, or the formation thereof. The flat panel detector component comprises a plurality of layers, where at least one of the layers comprises silk. Further, a silk layer may be in direct physical contact with a radiation detection layer.

20 Claims, 7 Drawing Sheets

FLAT PANEL DETECTOR INCORPORATING SILK LAYER(S)

BACKGROUND

The present application relates to the field of radiographic imaging. It finds particular application with the provision of radiation detectors in a radiography imaging system (e.g., mammography system, general radiology system, etc).

Radiographic imaging systems, such as projection radiography, computed tomography (CT) systems, line scanners, etc., provide information, or images, of the inside of an object under examination (e.g., interior aspects of an object under examination). Generally, the object is exposed to radiation, and one or more images are formed based upon the radiation absorbed by the object, or rather an amount of radiation that is able to pass through the object. Typically, highly dense objects absorb (e.g., attenuate) more radiation than less dense objects, and thus an object having a higher density, such as a bone or gun, for example, will appear differently than less dense objects, such as fatty tissue or clothing, for example. A detector array, generally positioned opposite a radiation source from which radiation is emitted relative the object under examination, is configured to detect radiation that traverses the object under examination and convert such radiation into signals and/or data that may be processed to produce the image(s). Such an image(s) may be viewed by security personnel to detect threat items (e.g., weapons, explosives, etc.) and/or viewed by medical personnel to detect medical condition.

In some scanners, such as projection radiography and three-dimensional imaging scanners (e.g., CT scanners), for example, the detector array and radiation source are mounted on opposing sides of a radiographic system, with the object under examination disposed there-between. In such a scanner, the radiation source emits a desired fluence of radiation directed toward the object under examination. The radiation is attenuated as it passes through the object under examination and reaches the detector on the other side. Digital image data of the object under examination can be produced by converting the detected radiation into an electrical signal (e.g., current or voltage) and measuring it. The number of photons that impact the detector is proportional to the amount of electrical signal measured by the detector. After that, an analog electrical signal from the detector is converted to a digital signal, and the digital signal can be used to create the image.

Flat panel detectors are typically used for projection radiography, where a burst of x-rays are directed toward an object and the flat panel detector is positioned behind the object. Projection radiography is typically utilized to produce two-dimensional images of an object (e.g., to diagnose internal medical issues in a patient, to examine internal objects in a suitcase). A flat panel detector can create digital image data, which can be used to produce images on a computer monitor or some other form of electronic display (or print-out).

Flat panel detectors (FPDs) can convert radiation to electrical signal(s), either directly or indirectly. An indirect FPD uses scintillators, for example, that convert x-ray photons to visible light photons, and has photodiodes distributed in a 2D array that detect the visible light photons and covert them to an electrical charge, which can then be converted to a digital signal. Alternately, direct FPDs utilize a radiation detection material that can convert x-ray photons directly into an electrical charge. For example, an amorphous selenium layer can create an electrical charge proportional to a number of impinging x-ray photons, and a 2D capacitor array can collect the electrical charges. In this both cases, the detector array can be addressed or mapped to respective pixels of the image.

Blocking layers are often implemented in a direct conversion FPD to allow (substantially) only one type of electrical charge (positive or negative) to transition or pass through one or more layers in the FPD while (substantially) blocking the transit of the opposite type of electrical charge. For example, blocking layers can be disposed at either side of a radiation detection layer to "block in" one type of charge within the radiation detection layer while allowing the opposite type of charge to "exit" the radiation detection layer. However, blocking layers, separation layers, and insulating layers are typically challenging to deposit. Furthermore, blocking layers are difficult to implement when they have to interface with chemically incompatible materials and/or there are contradictory requirements between their thickness and/or dielectric properties, for example.

SUMMARY

Aspects of the present application address the above matters, and others. According to one aspect, flat panel detector component is provided. The flat panel detector component comprises a plurality of layers where at least one of the layers comprises silk.

According to another aspect, a method is provided for forming a flat panel detector component used to detect actinic and non-actinic radiation. The method comprises forming at least one layer of silk that is in direct contact with a radiation detection layer.

According to yet another aspect, an apparatus for detecting x-rays is provided. The apparatus for detecting x-rays comprises an x-ray detector layer. The apparatus for detecting x-rays further comprises at least one silk layer that is in direct physical contact with the x-ray detector layer.

FIGURES

The application is illustrated by way of example and not limitation in the figures of the accompanying drawings, in which like references indicate similar elements and in which.

DESCRIPTION

Figure 1:
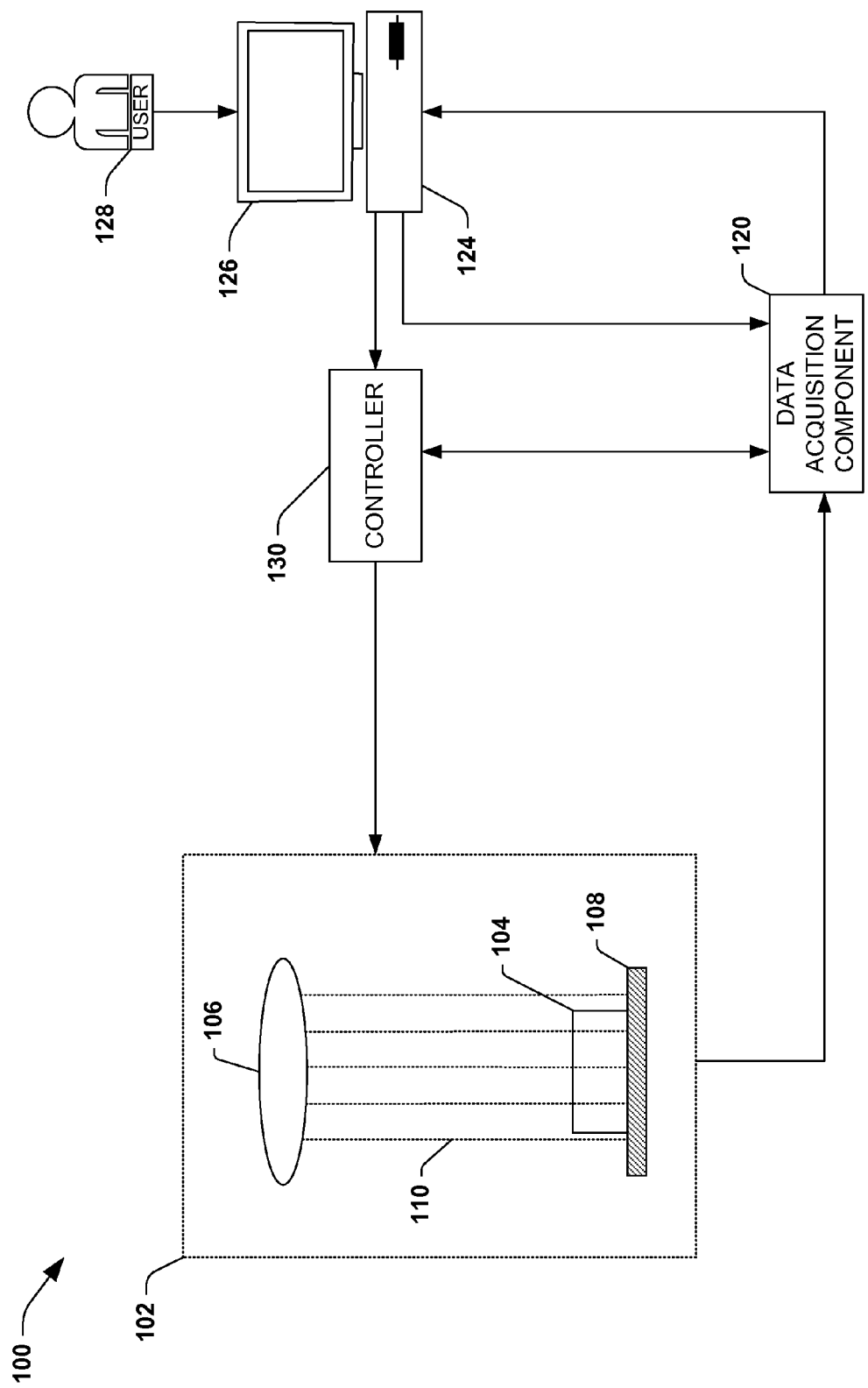
FIG. 1 is a schematic block diagram illustrating an example radiographic imaging apparatus.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 is an illustration of an example environment 100 in which data that is generated from components in a radiographic system 102 (e.g., flat panel detector) may be acquired so that one or more images of an object 104 under examination may be produced and displayed on a monitor 126, for example, such as for viewing by a human user 128 (e.g., radiologist). Such a system 102 may be used to diagnose medical conditions (e.g., broken bones) in a human patient at a medical center or in an animal at a veterinary clinic, and/or to identify objects of interest (e.g., potential threat objects, banned objects) associated with (e.g., comprising, comprised within, etc.) an object 104 (e.g., luggage) under examination at a security checkpoint, for example. In another embodiment, no image is generated, but a density (or some other object physico-chemical property) of respective objects (or aspects or parts thereof) can be identified and compared with a list of densities associated with predetermined items (e.g., banned items) to determine if the object 104 potentially comprises one or more of the predetermined items.

In the example environment 100, the radiographic system 102 can be configured to examine one or more objects 104 (e.g., a human patient, a series of suitcases at an airport, etc.). The radiographic system 102 can comprise a radiation source 106 (e.g., an ionizing or non-ionizing radiation source) and a detector 108 that can be mounted on a substantially diametrically opposite side of the radiographic system 102 relative to the radiation source 106. During an examination of the object(s) 104, the radiation source 106 emits radiation 110 towards the object(s) 104 under examination. Generally, when using a flat panel scanner, the radiation 110 is emitted substantially continuously during the examination. However, in some radiographic system, the radiation 110 may be pulsed during the examination.

As the radiation 110 traverses the object(s) 104, the radiation 110 may be attenuated differently by different parts of the object(s) 104. Because different parts attenuate differently the radiation 110, an image may be produced based upon the attenuation, or rather indirectly from it based on the variations in the number of photons that are detected by the detector 108. For example, more dense aspects of the object(s) 104, such as a bone or metal plate, for example, may attenuate more of the radiation 110 (e.g., causing fewer photons of different energies to strike the detector 108) than less dense materials, such as skin or clothing.

Radiation 110 that impinges the detector 108 generally creates an electrical charge that may be detected by one or more pixels, or elements, of the detector 108 that are in well defined spatial proximity to the location where the radiation impinged. Respective pixels/detector elements generate an analog signal proportional to the electrical charge detected (e.g., generated by direct x-ray detector elements in the detector 108), and such signals are fed to a data acquisition component 120 (which may be integral with the system 102). Because the electrical charge detected by the one or more pixels is directly related to the number of photons, the output is indicative of the attenuation of the radiation 110 as it traversed the object(s) 104. It will be appreciated that, in one embodiment, when a pixel is not collecting electrical charge, the pixel will produce an analog, baseline signal that indicates that the pixel has detected no electrical charge.

It will be understood to those skilled that in some embodiments, an analog to digital (A/D) signal converter (not shown, but generally operably coupled with or comprised within the detector array 108 and/or the data acquisition component 120) may be configured to receive the analog signals and convert the signals into digital signals. The data acquisition component 120 is configured to prepare the output signals to produce an image, such as by a computer system 124. In one embodiment, configuring the output signals for producing an image can comprise remapping (also referred to herein as converting or encoding) the output signals from a first format to a second format that is more suitable for image generation, transmission and/or presentation.

In the example environment 100, signal data from the data acquisition component 120 is transmitted to a work station 124 that is configured to receive the image data, for example. The work station 124 is configured to produce one or more images of the object 104 under examination using algebraic, iterative, or other image processing techniques known to those skilled in the art (e.g., filtered back projection). In this way, the data is converted from an electrical signal to an image, so as to be more understandable to a user 128 (e.g., medical personnel, security, personnel, etc.) viewing the image(s) on a monitor 126 of the work station 124, for example. A user 128 can thus inspect the image(s) to identify areas of interest within the object(s) 104. The work station 124 can also be configured to receive user input which can direct operations of the radiography system 102 (e.g., radiation dose, etc.) and/or can direct the work station 124 to display an image or series of images of the object(s) 104 in a particular manner, for example.

In the example environment 100, a controller 130 is operably coupled to the work station 124. In one example, the controller 130 is configured to receive user input from the work station 124 and generate instructions for the radiography system 102 indicative of operations to be performed. For example, the user 128 may want to rescan the object(s) 104 using a different dose or energy of radiation and the controller 130 may issue an instruction instructing the radiation source 106 to emit a desired dose or energy of radiation 110.

In the example environment 100, the detector 108 can comprise radiation detector film and/or chemicals, image plates, image intensifiers, or flat-panel radiation detectors. A flat-panel detector (FPD) can comprise an apparatus that digitally produces images for radiographic systems 102, for example, instead of utilizing analog-based films/screen or image plates. FPDs utilize solid-state technology combined with integrated circuits that perform similar functions as those found in digital photography and videography.

A FPD (e.g., 108) can comprise thin-film-transistor (TFT) 2D arrays or CMOS 2D arrays coupled with one or more components that detect radiation and convert it into an electrical current or voltage. For example, indirect FPDs utilize a scintillator layer that reacts to a detected x-ray photon by producing light. In this example, the light produced by the scintillator is converted to an electrical charge by coupled photodiodes that convert light into electrons. The electrons produced by the photodiodes are stored in the pixel capacitors and switched out by the TFTs and used to produce an image based on an amount of electrical charge detected, at least as described above.

As another example, a direct FPD utilizes a radiation detection layer that converts detected x-ray photons to an electrical charge. In this example, the charge produced by the radiation detection layer can be stored at a particular pixel location on the pixel capacitor, to indicate a number of photons detected at that pixel location. The charge detected is switched out by associated TFTs to create a digital image of the irradiated object, for example.

Figure 2:
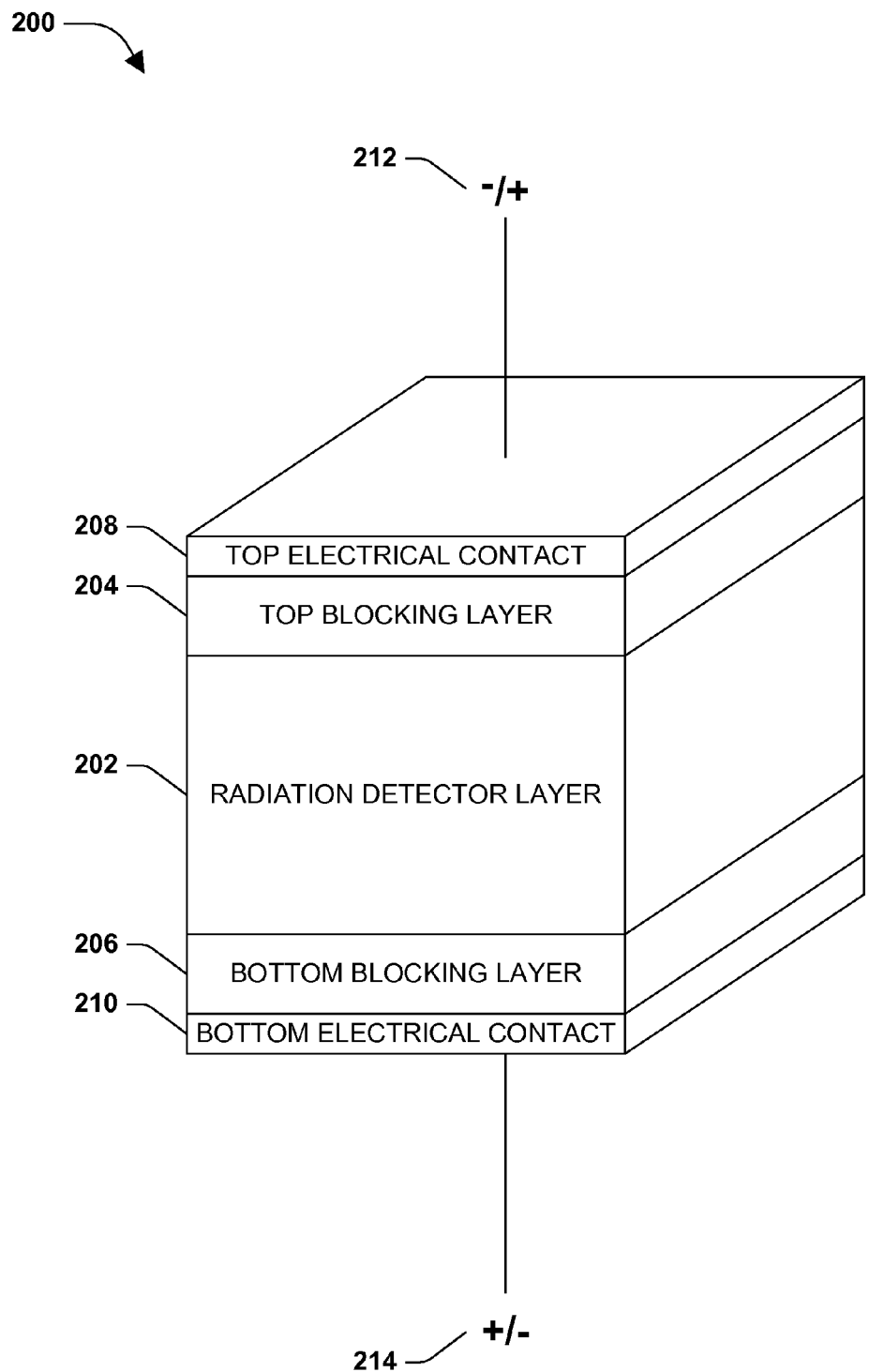
FIG. 2 is a perspective view illustration of existing technology for use in a direct conversion flat panel detector.

FIG. 2 is a component diagram illustrating an example embodiment 200 of one or more portions of existing technology used in a direct conversion FPD. A radiation detection layer 202 is configured to detect radiation, such as actinic (ionizing) and non-actinic (non-ionizing) type radiation. The radiation detection layer may be comprised of different materials capable of absorbing radiation and responding by producing an electrical charge, often referred to as an x-ray photoconductive material. For example, a commonly used photoconductive material is amorphous selenium that absorbs x-rays and converts them into an electrical charge, such as an electron hole pair.

In one embodiment, an applied voltage bias can be used to direct the charge carriers to a desired side of the radiation detection layer 202, such as where the negative charge is desired to move in a direction toward the bottom (e.g., 214) and the positive charge in a direction toward the top (e.g., 212), for example. It will be appreciated that +/− and −/+ notations are used in the Figures to depict a positive or negative bias applied to a top electrical contact and a corresponding negative or positive bias applied to a bottom electrical contact. By way of example, to move negatively charged electrons in a direction from the top to the bottom, a negative bias may be applied to the top of the FPD (to drive the like charged electrons in a direction away from the top) and a positive bias may be applied to the bottom of the FPD (to attract the oppositely charged electrons in a direction toward the bottom). This same applied bias would move positively charged holes to move in a direction away from the positively biased bottom electrical contact and toward the negatively biased top electrical contact. In the exemplary embodiment 200, a top blocking layer 204 and bottom blocking layer 206 are directly in contact with the radiation detection layer 202. In one embodiment, a blocking layer can be configured to block either a positive charge carrier (N-type blocking layer) or a negative charge carrier (P-type blocking layer). Therefore, for example, the top blocking layer 204 can comprise a P-type blocking layer (e.g., that only blocks negatively charged electrons), thereby only allowing the positive charge carriers to move toward the top 212; and the bottom layer 206 can comprise an N-type blocking layer (e.g., that only blocks positive charges), thereby only allowing the negative charge carriers to move toward the bottom 214.

Typically, a blocking layer is made or comprised of a thin layer of the radiation detection layer, such as amorphous selenium, that has been doped. Regions, such as layers, can be doped by different techniques, such as implantation and/or diffusion, for example. N-type dopants may comprise alkalies, for example, and P-type dopants may comprise arsenic, for example. It will be appreciated that doping is not limited by the one or more examples set forth herein, and may comprise other/different techniques, and/or doping agents, for example.

In one embodiment, the blocking layer (e.g., 204, 206) may be replaced by an isolation layer. An isolation layer can be comprised of a dielectric material that is configured to electrically isolate the radiation detection layer 202, at least at the side of direct contact. Parylene is a polymer that is commonly used as a dielectric, isolation barrier in FPDs and other solid-state circuits.

In the example embodiment 200, a top electrical contact 208 and a bottom electrical contact 210 are disposed in direct contact, respectively, with the top blocking layer 204 and bottom blocking layer 206. In an alternate embodiment, for example, the top blocking layer 204 is replaced with an isolation layer and the contact layer 208 is applied on top of it. The electrical contact layer 210 may be deposited on a 2D TFT and capacitor array on a glass substrate where a plurality of capacitors receive and temporarily store the electrical charge from the radiation detection layer 202.

In one embodiment, x-ray photons may be directed toward the FPD, such as from the top. The x-ray photons are absorbed by the radiation detection layer, such as amorphous selenium, and converted to electrical charge carriers, such as electron-hole pairs. In one embodiment, an applied bias drives the positive charge carriers to migrate in a direction toward the top, and the negative charge carriers to migrate in a direction toward the bottom. Further, the top blocking layer can be a P-type blocker that only allows the positive charge carriers to pass therethrough; and the bottom blocking layer can be an N-type blocker that only allows the negative charge carriers to pass therethrough. In one embodiment, a pixel addressing scheme can be used for respective capacitors in the electrical contacts, where an electrical charge received by a capacitor is assigned to a particular pixel location. In this way, for example, an image can be digitally created from electrical charges collected by the respective capacitors.

Figure 3:
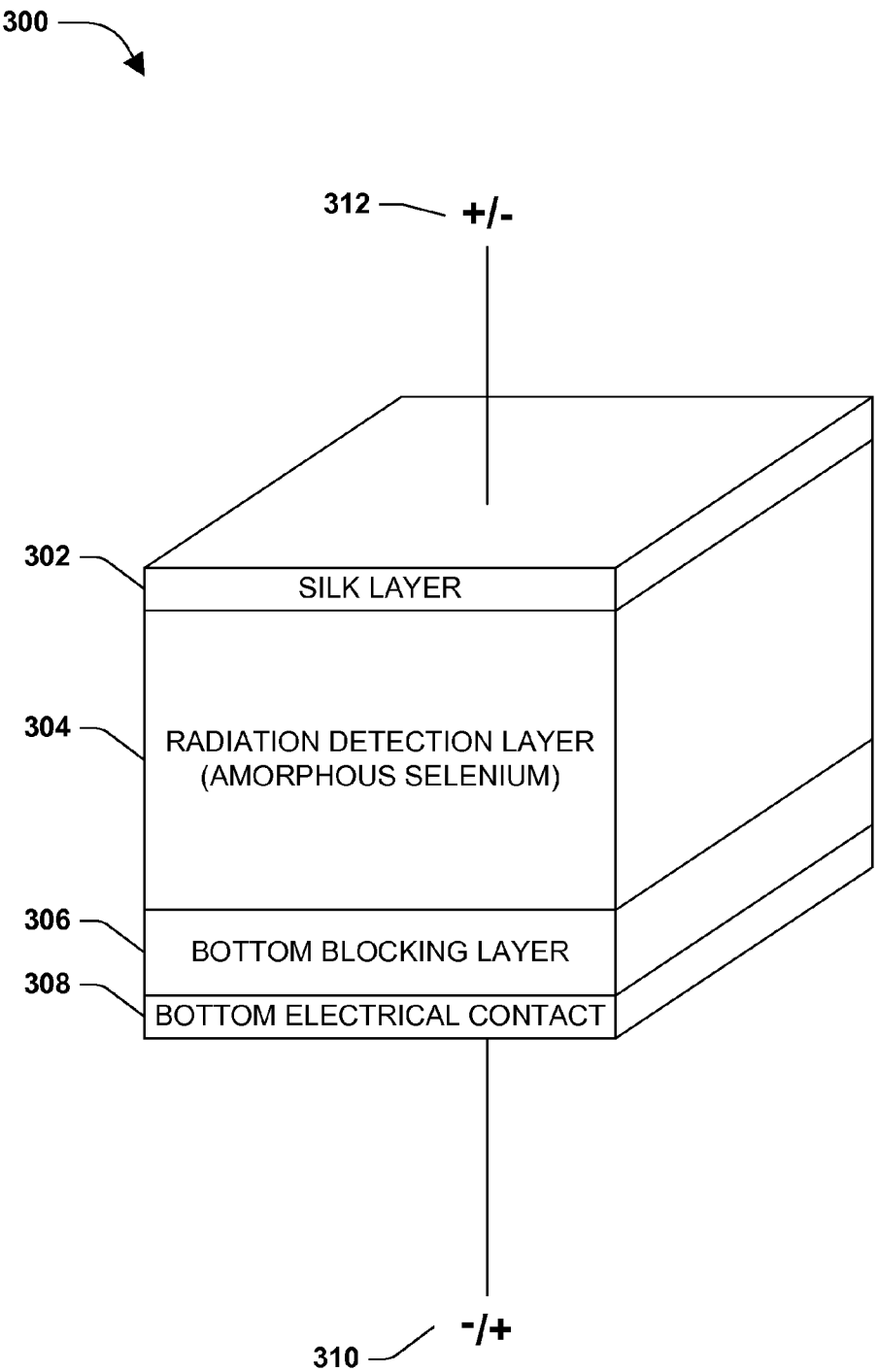
FIG. 3 is a perspective view illustration of an example flat panel detector component as described herein.

FIG. 3 is a component diagram of an example flat panel detector component 300 for detecting actinic and non-actinic radiation as provided herein. In this embodiment, the flat panel detector 300 comprises a plurality of layers, where at least one of the layers comprises silk 302. Silk has properties that are desirable for use in a FPD. Depending on a thickness of the silk layer, for example, the silk layer may act as an insulating layer due to its dielectric properties. Further, as an example, the silk layer may serve as a blocking layer as it may provide N-type blocking properties. A silk layer may be thinner than conventional blocking layers, however, and thus may provide for use in special applications like, for example, with liquid crystals. Additionally, the formation (e.g., deposition) process of silk in the flat panel detector is typically easier to perform that that of other materials used in this manner in a FPD.

A bottom electrical contact 308 is disposed on a substrate (not shown), such as glass, silicon or some other suitable substrate. The bottom electrical contact can, for example, be deposited on capacitors configured to temporarily store an electrical charge, for example, where respective capacitors are arranged in a 2D pixel-type array addressed by rows and columns. In this way, in this example, an electrical charge received by a capacitor can be associated with a specific location in the FPD in order to create a digital image. The charges accumulated on the capacitors can be read out by using a 2D matching array of TFTs or CMOS electronics, for example.

A bottom blocking layer 306 is disposed in direct contact with the bottom electrical contact 308. As described above, the bottom blocking layer 308 can be configured to block a desired charge, such as a negative or positive charge carrier (e.g., negatively charged electron, or positively charged hole). In one embodiment, the bottom blocking layer 306 can be or comprise a doped portion of a radiation detection layer 304. As described above, the radiation detection layer can be doped with a desired material that provides blocking of desired charge carriers. As an example, the bottom blocking layer 306 can be radiation detection layer material doped with alkalies to provide an N-type blocking layer, thereby only allowing negative charge carriers (e.g., electrons) to pass through to the bottom electrical contact 308. It will be appreciated that other materials can be used and doped (or not) for the blocking layer (and/or other blocking layers mentioned herein), alone or in combination with one another.

The radiation detection layer 304 is disposed in direct contact with the bottom blocking layer 306. As described above, the radiation detection layer comprises a material that absorbs radiation and produces a proportional electrical charge. In one embodiment, the radiation detection layer 304 can comprise amorphous selenium. When amorphous selenium is utilized, the FPD is considered to be a "direct" detector as incident x-ray photons that strike the amorphous selenium are converted directly to an electrical charge. For example, when an x-ray photon is absorbed by the amorphous selenium layer many electron-hole pairs are created. A bias is applied to the amorphous selenium layer (and across the FPD generally) to drive the charge carriers (negative electrons and positive holes) to separate sides according to the polarity of the bias. For example, the negative charge carriers may be driven to migrate in a direction toward the top 312, such as where an opposing polarity positive bias is applied to the top 312, and the positive charge carriers may be driven to migrate in a direction toward the bottom 310, such as where an opposing polarity negative bias is applied to the bottom 310 of the detector component 300. Moreover, where the bottom blocking layer 306 comprises a P-type blocking material, electrons may not be able pass therethrough. Similarly, where the silk layer comprises an N-type blocking material, holes may not be able to pass there-through.

It will be appreciated that the radiation detection layer 304 is not limited to the embodiments described herein. The radiation detection layer can comprise any appropriate material that provides radiation detection properties suitable for use in a flat panel detector (e.g., doped amorphous selenium monocrystals and polysilicon). Further, in one embodiment, the radiation detection layer may comprise a combination of materials, such as a particle in binder (PIB) combination, for example, that comprises a radiation detection material suspended in a binder material.

In the example FPD component 300, the silk layer 302 is disposed in direct physical contact with the radiation detection layer 304. In one embodiment, the silk layer 302 can be configured to electrically insulate a side of the radiation detection layer 304 with which it is in contact. That is, for example, the silk layer 302 can provide an insulation or dielectric layer, such that neither positive or negative electrical charges can transition past one side of the radiation detection layer 304 (e.g., the top side 312). In this way, in this example, the desired electrical charge (e.g., positive or negative) produced when radiation impacts the radiation detection layer 304 can be directed to accumulate on one side of the radiation detection layer 304 (e.g., the bottom side of 302).

In one embodiment, the FPD component may comprise a silk layer on both a first and second side of the radiation detection layer 304. In this embodiment, the silk layers can electrically insulate the radiation detection layer on two sides. For example, the FPD component may be configured such that a bias applied thereacross produces a substantially planar distribution of charges at a first and second side of the radiation detection layer. That is, in this example, the bias may provide for a substantially planar distribution of the negative electrical charge (e.g., electrons) toward the bottom of the radiation detection layer 304, with a corresponding substantially planar distribution of the positive electrical charge (e.g., holes) toward the top of the radiation detection layer 304. In this embodiment, the resulting charge distributions may be utilized by one or more other component in the FPD to facilitate image generation.

In one embodiment, the silk layer can behave as a blocking layer. For example, depending on an amount of silk and/or a thickness of the silk in the layer, the silk layer may be utilized as an N-type blocking layer (or P-type blocking layer if appropriately doped, for example). As described above, for example, the N-type blocking properties of the silk layer can block positive charge carriers from transitioning past the silk layer, and only allow negative charge carriers to transition across the silk layer. In one embodiment, another layer may be disposed at the other side of the silk layer (e.g., the opposite side of the radiation detection layer 304). For example, referring to FIG. 3, the silk layer 302 may be disposed between the radiation detection layer 304 and a top electrical contact layer (not shown). In this example, the top silk layer can comprise an N-type blocking layer that merely allows the negative charge carriers to transition to the top electrical contact layer for use in imaging.

Figure 4:
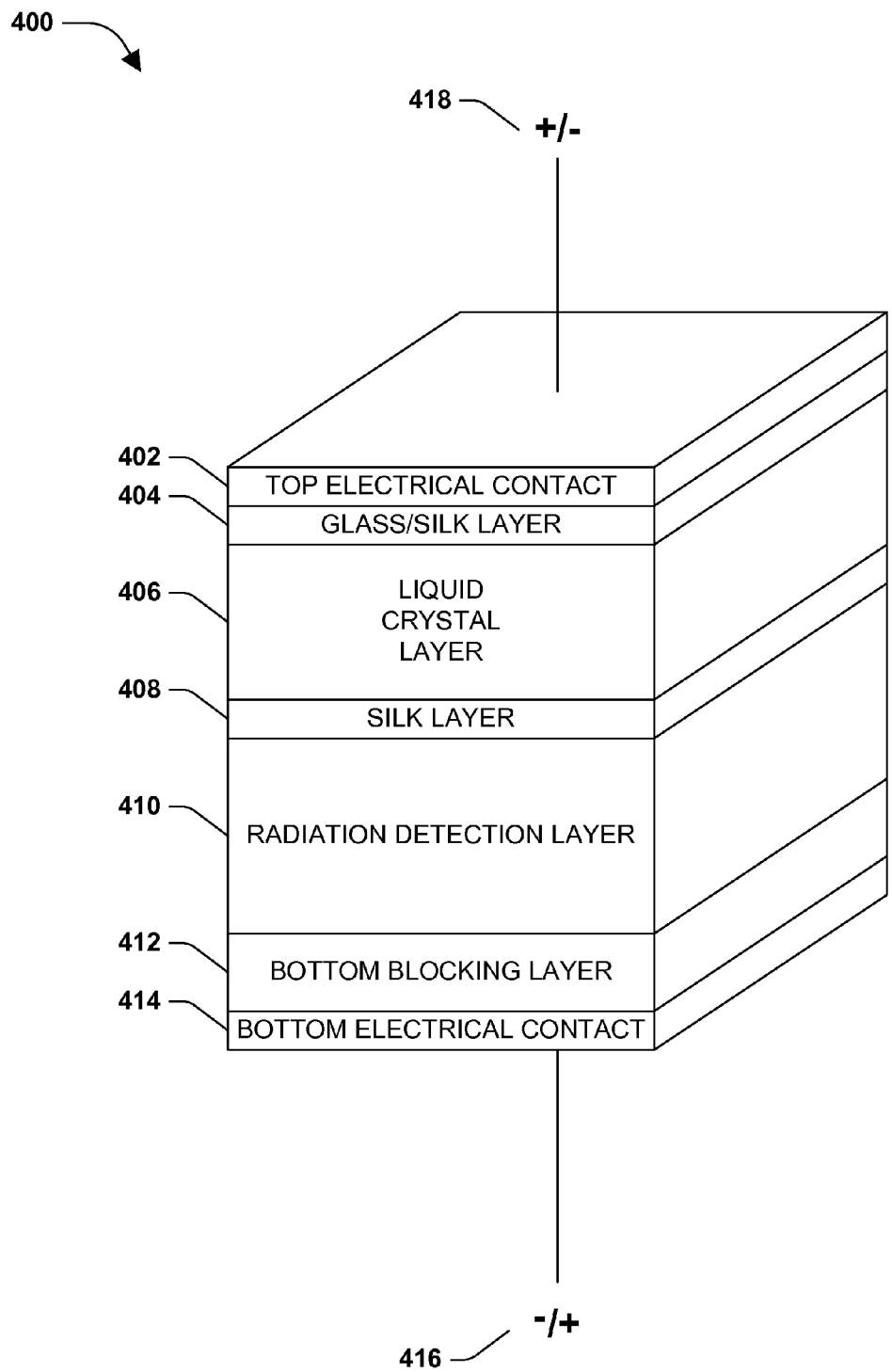
FIG. 4 is a perspective view illustration of an example flat panel detector component as described herein.

FIG. 4 is a component diagram illustrating an example embodiment 400 of one or more components described herein. In this example embodiment 400, a flat panel detector component (e.g., 300 of FIG. 3) is configured for use in a liquid crystal display apparatus. As described above, a bottom electrical contact 414 (e.g., used to apply a voltage bias) can be disposed on a substrate (not shown), and a bottom blocking layer 412 can be disposed in direct contact with the bottom electrical contact 414. A radiation detection layer 410 (e.g., comprising amorphous selenium) is disposed in direct contact with the bottom blocking layer 412, where the bottom blocking lay may comprise or be comprised of a doped layer of radiation detection layer material.

A first silk layer 408 is disposed in direct physical contact with the radiation detection layer 410, for example, at a top of the radiation detection layer 410 opposite the bottom blocking layer 412. A liquid crystal layer 406 can be disposed in contact with the silk layer 408, such as at an opposite side from the radiation detection layer 410. By way of example, a polarizer layer (not shown) may be formed over liquid crystal layer 406 (e.g., on top of, with or without other layers in between the liquid crystal layer 406 and the polarizer layer), which can facilitate image read-out. In this example, the crystals in the liquid crystal layer 406 can have a twisted or relaxed alignment, where, utilizing polarized light, a first phase (e.g., relaxed or twisted) allows light to pass through and a second phase (e.g., twisted or relaxed) inhibits light from passing through.

The alignment of the liquid crystals can be changed by an electrical field, such that molecular axes of the liquid crystals align with the electrical field (e.g., parallel to field lines). Therefore, for example, an electrical field can be used to align the liquid crystals as desired, where respective aligned liquid crystals form respective pixels. In one embodiment, the electrical charges produced by the radiation detection layer 410 create an electrical field which changes the liquid crystal phases, thus allowing for light to selectively pass through pixel related locations for an image to be formed thereby.

In the example embodiment 400, a second silk layer 404 is disposed between the liquid crystal layer 406 and a glass layer. That is, although the second silk layer 404 and the glass layer are illustrated as a single layer, generally the second silk layer is in direct physical contact with the liquid crystal layer 406 and a glass layer is formed over the second silk layer. A top electrical contact 402 (e.g., used to apply a voltage bias) is formed over the glass layer. In one embodiment, the second silk layer 404 may comprise a pattern that can provide a desired pattern template for a non-silk layer, such as the liquid crystal layer 406, that is disposed in contact with the silk layer 404. In this way, for example, when an electrical field is applied to the liquid crystal layer 406, the liquid crystals may align in the desired pattern when in the appropriate phase, thereby creating a desired visual effect. In yet another embodiment, the silk layer 404 may be absent and the pattern is applied directly on the glass layer.

As an illustrative example, x-ray photons may be directed toward the radiation detection layer 410 from the top side 418. The photons are converted to electrical charge carriers in the radiation detection layer 410, which move toward the top and/or bottom of the device 400 depending on the bias applied (e.g., a negative voltage bias applied to the top electrical contact 402 and a positive voltage bias applied to the bottom electrical contact 414). In this example, the bottom blocking layer 412 can inhibit positive charge carrier movement and merely allow negative charge carriers to transition toward the bottom 416. Similarly, the first silk layer 408 can inhibit negative charge carrier movement and merely allow positive charge carriers to transition toward the top 418 of the detector component 400.

In one embodiment, the first silk layer 408 may comprise a thickness of ten to hundreds of nanometers. In this way, when the silk layer serves as an insulating or dielectric layer, for example, an electrical field created by a substantially planar distribution of positive charge carriers (or negative charge carriers if an opposite bias is applied across the device 400) at a location where an x-ray photon impinged the radiation detection layer 410 can be contained by the first silk layer 408 and resultantly affect the phase of the liquid crystals. In one embodiment, the liquid crystal layer can be considered as pixels, where respective pixels comprise liquid crystals that can be switched between phases depending on the electrical field created at the first silk layer 408. As an example, an image may be created reading through the liquid crystal layer, where respective pixels are affected proportionally by an amount of electrical charge converted from photons. In this way, the FPD component may comprise a direct read capability, where a radiologist, for example, can directly read an image produce by the FPD from a radiographic scan.

Figure 5:
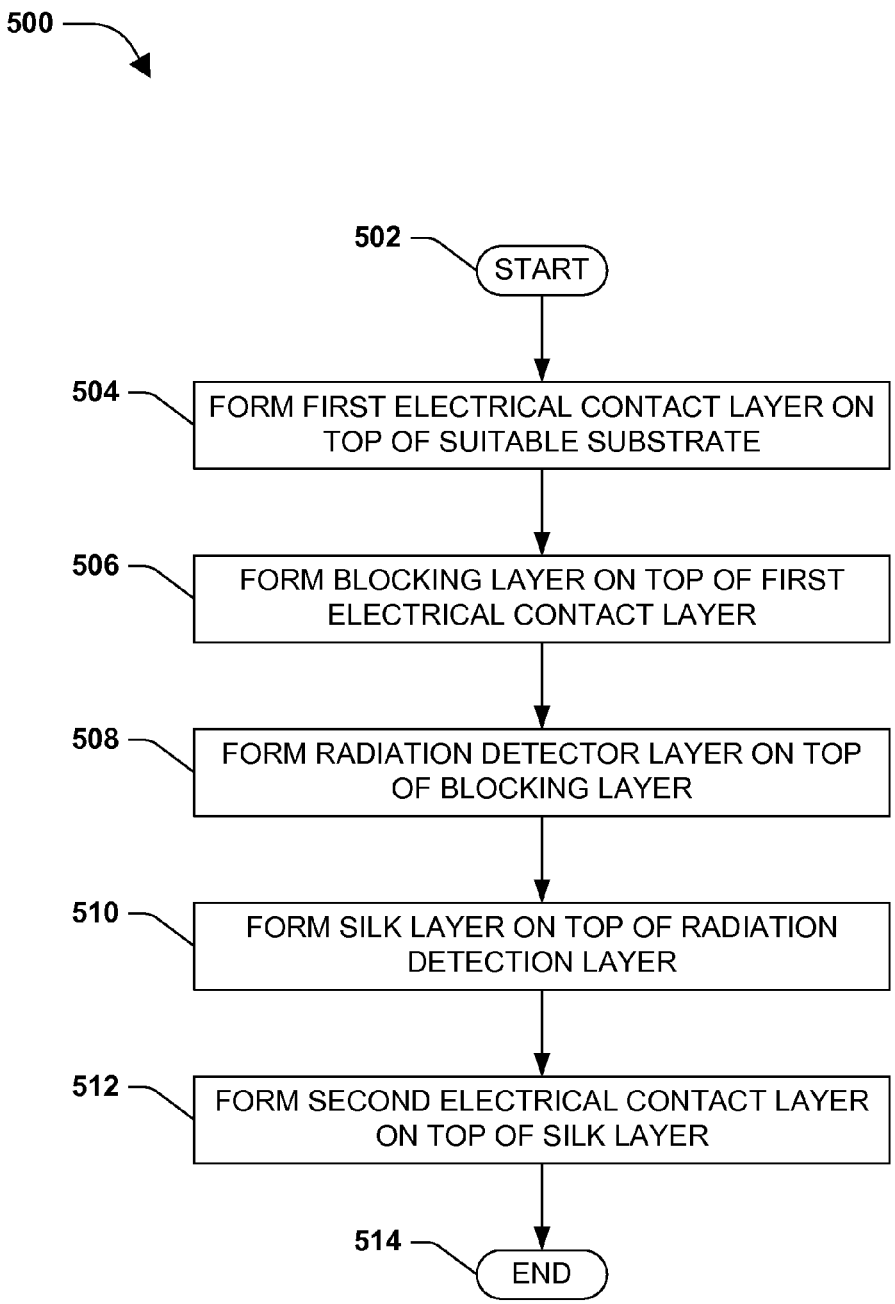
FIG. 5 is a flow diagram illustrating an example method for forming a flat panel detector component.

A method may be devised for forming a flat panel detector (FPD) that can be used to detect actinic and non-actinic radiation. Such a FPD may be formed with at least one layer of silk. FIG. 5 is a flow diagram 500 illustrating an example method for forming a FPD. FIGS. 3-4 are perspective views of a flat panel detector component 300, 400 whereon such a method may be implemented, or rather which may result from implementing such a method. While the method 100 is illustrated and described as a series of acts or events, it will be appreciated that the present disclosure is not limited by the illustrated ordering of such acts or events. For example, some acts may occur in different orders and/or concurrently with other acts or events apart from those illustrated and/or described herein. In addition, not all illustrated acts may be required to implement a methodology in accordance with one or more aspects or embodiments set forth herein. Further, one or more of the acts depicted herein may be carried out in one or more separate acts and/or phases.

The example method 500 begins at 502 and includes forming a first electrical contact layer on top of a suitable substrate, at 504. For example, a CMOS or thin-film transistor (TFT) layer forming an Active Matrix Array, Electrometer Probes and/or Microplasma Line Addressing, etc. may be formed together with an electrical contact layer on top of glass, silicon, polysilicon, and/or some other appropriate substrate. For example, the contact may be formed, at least in part, by chemical vapor deposition, sputtering and/or spin on coating, etc. Further, a 2D capacitor array may be formed connected to the electrical contact layer, which can be used to collect electrical charge produced by the flat panel detector. It will be appreciated that substrate as used herein may comprise any type of appropriate body (e.g., glass, silicon, SiGe, SOI, etc.) such as a glass sheet, semiconductor wafer and/or one or more die on a wafer, as well as any other type of epitaxial and/or other organic and/or inorganic layers formed thereover or otherwise associated therewith.

At 506, a blocking layer is formed on top of the first electrical contact layer. In one embodiment, the blocking layer can comprise a doped layer of radiation detection layer material. For example, an amorphous selenium can be doped with (e.g., by evaporation or diffusion) arsenic, cesium, sodium, or some other appropriate doping agent. It will be appreciated that regions (e.g., layers) can be doped by different techniques, such as evaporation and/or diffusion, for example, and that doping is not meant to be limited by the one or more examples set forth herein. N-type dopants may comprise alkalies from sodium to cesium, for example, and p-type dopants may comprise arsenic, for example.

At 508, a radiation detection or detector layer is formed on top of the blocking layer. The radiation detection layer can be formed in direct contact with the blocking layer by any appropriate semiconductor application method, including but not limited to, chemical vapor deposition, physical vapor deposition, electrochemical deposition, molecular beam epitaxy, and/or atomic layer deposition, etc. (where any one or more other layers mentioned herein can likewise be formed using any one or more of these and/or other techniques) Further, the deposition of the radiation detection layer may be determined, at least in part, by a type of material used in the layer. For example, amorphous selenium can be applied by a conventional vacuum evaporation technique, at an appropriate temperature.

At 510, a silk layer is formed on top of the radiation detection layer. Silk is a natural protein fiber that is produced by silk-worms making a cocoon. The silk can be formed into a silk solution (e.g., silk fibroin solution) by dissolving the silk in an appropriate solvent. For example, silk can be dissolved in an aqueous salt solution and/or an organic solvent, such as hexafluoroisopropanol. In one embodiment, the silk solution can be deposited on the radiation detection layer by spin coating. Spin coating can be used to apply a very thin and uniform coating of the solution to a flat substrate. For example, a desired amount of the silk solution can be placed on the substrate, which is rotated at a high speed, spreading the solution by centrifugal force. Once a desired thickness is applied, the solvent can be evaporated, thereby leaving a desired thickness of the silk as a layer on the radiation detection layer, for example. In this way, as an example, the silk can be deposited at room temperatures, under controlled conditions that provide for a substantially precise thickness (e.g., very thin as desired) of silk to be layered uniformly, and that does not substantially impact other existing layers, components, materials, etc. (e.g., as the silk is not applied at elevated temperatures that could adversely affect (e.g., melt or crystallize) existing layers, elements, features, etc). Further, a silk layer can be patterned to facilitate alignment of liquid crystals in a desired orientation.

It will be appreciated that the deposition of the silk layer is not limited to the examples described herein. It is anticipated that those skilled in the art may devise alternate techniques for applying a silk coating layer in a FPD.

At 512, in the example method 500, a second or top electrical contact layer is formed on top of the silk layer (e.g., in a manner similar to that for forming the first or bottom electrical contact layer). Having formed the second electrical contact layer, the example method 500 ends at 514. It will be appreciated that one or more of the acts of FIG. 5 may be used in forming one or more of the component parts or layers of the structures illustrated in FIGS. 3, 4 and/or 7, for example.

Figure 6:
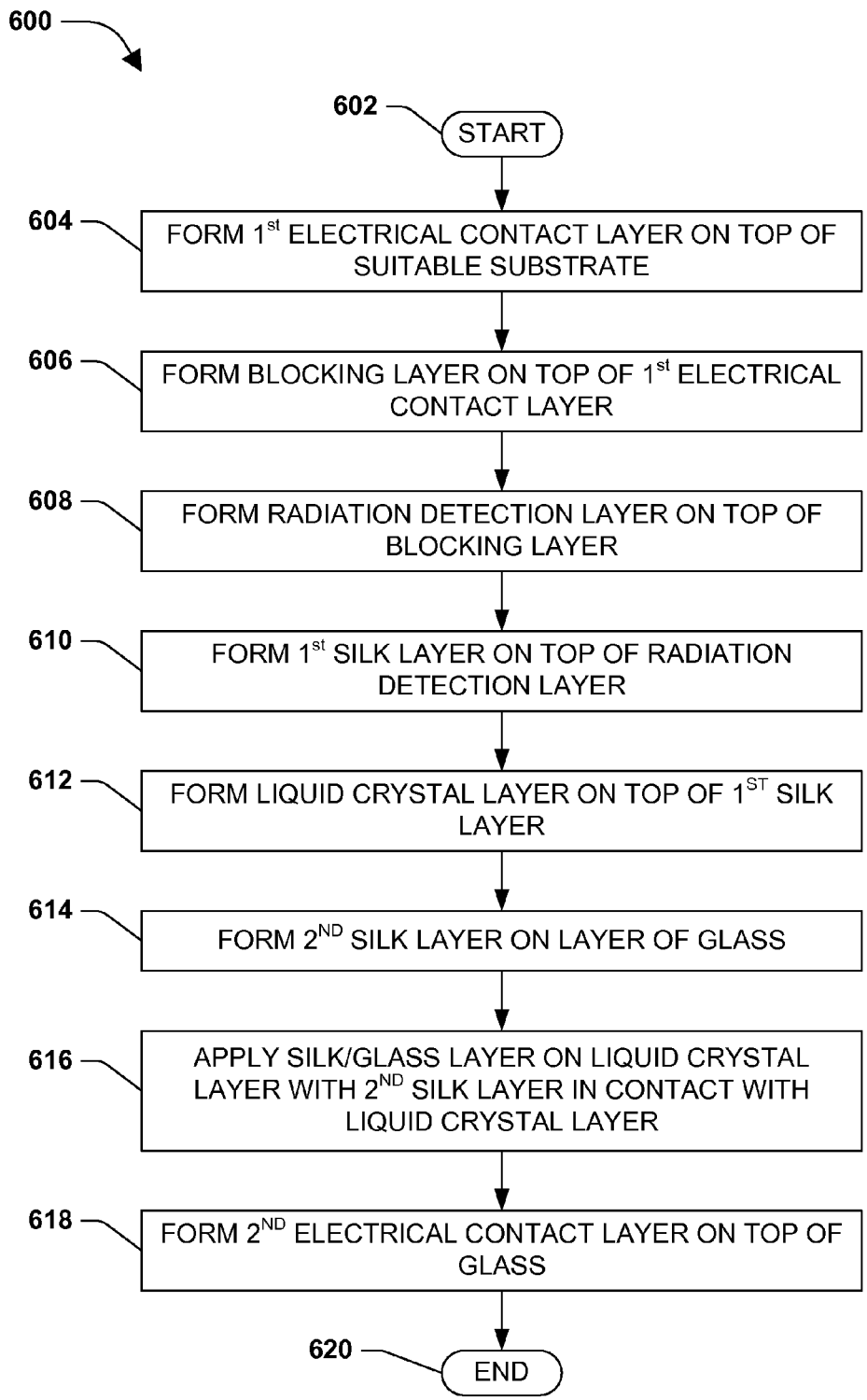
FIG. 6 is a flow diagram illustrating an example method for forming a flat panel detector component.

FIG. 6 is a flow diagram illustrating one embodiment 600 of techniques described herein. This embodiment 600 begins at 602 and involves forming a first electrical contact layer on top a suitable substrate, at 604; forming a blocking layer on top of the first electrical contact layer, at 606; forming a radiation detection layer on top of the blocking layer, at 608; and forming a first silk layer on top of the radiation detection layer, at 610, as described above in FIG. 5.

At 612, a liquid crystal layer is formed on top of, and in direct contact with, the first silk layer. In this way, the first silk layer is disposed between the radiation detection layer and the liquid crystal layer. At 614 a second silk layer is formed on a glass layer or one or more other optically transparent materials, such as by spin coating or some other appropriate technique. In one embodiment, a pattern can be formed on the second silk layer, in order to provide a template for a non-silk layer that can be formed in contact with the second silk layer. For example, a pattern can be formed in the silk layer to provide a desired lining pattern for the liquid crystal layer.

It will be appreciated that lithographic techniques can be implemented in forming any one or more of the layers (or portions thereof) described herein, such as for performing patterning, masking, etching, etc. actions, for example, where lithography broadly refers to processes for transferring one or more patterns between various media. In lithography, a light sensitive resist coating is formed over one or more layers to which a pattern is to be transferred. The resist coating is then patterned by exposing it to one or more types of radiation and/or light that (selectively) passes through an intervening mask containing the pattern. The light causes exposed or unexposed portions of the resist coating to become more or less soluble, depending on the type of resist used (e.g., positive or negative), and the pattern in the intervening mask is indelibly formed therein. A developer is then used to remove the more soluble areas leaving the patterned resist. The patterned resist can then serve as a template for the underlying layer or layers which can be selectively etched or doped or otherwise treated. Once the underlying layer is treated, the patterned resist is removed (e.g., chemically stripped) leaving the treated layer (e.g., having the pattern formed therein).

At 616 the combined second silk layer and glass are applied on top of the liquid crystal layer (e.g., with the second silk layer in contact with the liquid crystal layer). For example, liquid crystal layer is typically surrounded by walls to form a complete seal, such that the liquid crystals cannot leak out of the component. At 618, a second electrical contact can be formed on top of the glass. Having formed the second electrical contact layer, the example embodiment 600 ends at 620.

It will be appreciated that the one or more silk layers formed in a FPD can have many uses and are not limited to the uses described herein. In one embodiment, for example, a silk layer may be formed as an insulating layer, such as to provide electrical insulation to one or more components/layers of the FPD. Further, a silk layer may be formed as a blocking layer, for example, to provide blocking of a desired electrical charge. Additionally, a silk layer may be formed as a separation layer, providing physical separation between two layers, such as to mitigate interaction between materials (e.g., chemical interaction). As described above, the silk layer may also be formed as a pattern layer. It will be appreciated that one or more of the acts of FIG. 6 may be used in forming one or more of the component parts or layers of the structures illustrated in FIGS. 3, 4 and/or 7, for example.

Figure 7:
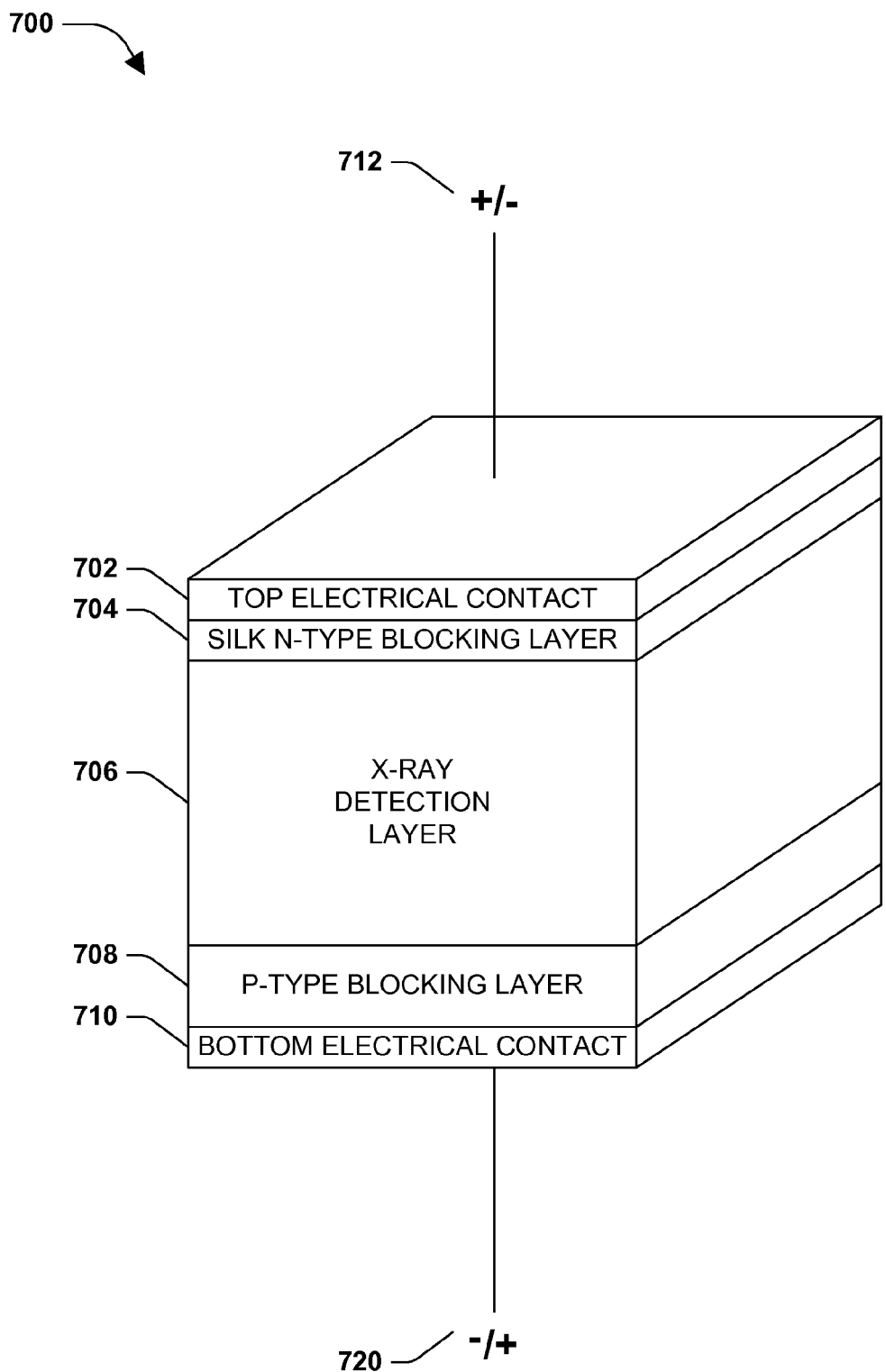
FIG. 7 is a perspective view illustration of an example flat panel detector component as described herein.

FIG. 7 is a component diagram illustrating an alternate embodiment of an apparatus 700 for detecting x-rays. The apparatus 700 comprises an x-ray detection layer 706, such as amorphous selenium. As described above, when x-rays are absorbed in amorphous selenium, electrical charges can be produced, for example, where the electrical charges are proportional to the number of x-ray photons that impact the amorphous selenium. The x-ray detection layer can comprise various materials appropriate for detecting x-rays. For example, the x-ray detection layer may comprise: a lead oxide based material; cadmium selenide, cadmium telluride; mercury iodide; cadmium zinc telluride; lead iodide; titanium tetrabromide; and/or an x-ray detecting particles in a binder, etc.

The apparatus 700 further comprises at least one silk layer 704, which is in direct contact with the x-ray detection layer 706. In one embodiment, the silk layer 704 is an N-type blocking layer, where the silk layer blocks transition of positive charge carriers (e.g. holes) between the x-ray detection layer 706 and a top electrical contact layer 702. In this way, for example, only negative charges may transition from the x-ray detection layer 706 to the top electrical contact layer 702.

In one embodiment, the apparatus may further comprise a P-type blocking layer 708. In this embodiment, the P-type blocking layer 708 can inhibit negative charge carriers (e.g., electrons) from entering a bottom electrical contact layer 710, and thus only allow positive charges to reach the bottom electrical contact layer 710. The P-type blocking layer may comprise or be comprised of a portion of the x-ray detection layer that has been doped with arsenic, for example. As an illustrative example, when one or more x-ray photons are absorbed by the x-ray detection layer 706 many electron-hole pairs can be produced. The electrons (negative charge carriers) can transition across the N-type blocking layer 704 to the top electrical contact layer. The positive electrical charges (e.g., holes) can transition across the P-type blocking layer 708 to the bottom electrical contact layer 710, for example.

In one embodiment, a liquid crystal display component (not shown) may be used with the apparatus, and be configured to provide an indication of detected x-rays (e.g., for direct read-out of a digital image representative of x-rays attenuated by an object being scanned). In this embodiment, the liquid crystal display component can comprise a first silk layer that is in direct contact with a liquid crystal layer. Further, the liquid crystal display component can comprise a second silk layer in direct contact with the x-ray detection layer. In this way, for example, an electrical field can be generated in the x-ray detection layer at the second silk layer. The electrical field can affect the liquid crystals phase to create an image indicative of the photons received by the x-ray detection layer at the corresponding locations in the x-ray detection layer. Further, the first silk layer can be patterned such that the liquid crystals will align in a desired orientation.

It will be appreciated that while reference may be made throughout this document to exemplary structures in discussing aspects of one or more methodologies described herein (e.g., those structures presented in FIGS. 3, 4 and/or 7 while discussing the methodologies set forth in FIGS. 5-6), that those methodologies are not to be limited by the corresponding structures presented. Rather, the methodologies and structures are to be considered independent of one another and able to stand alone and be practiced without regard to any of the particular aspects depicted in the Figs. Additionally, the structures and/or layers described herein can be formed in any number of suitable ways, such as with spin-on techniques, sputtering techniques (e.g., magnetron or ion beam sputtering), (thermal) growth techniques and/or deposition techniques such as chemical vapor deposition (CVD), for example.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A flat panel detector component for detecting at least one of actinic radiation or non-actinic radiation, comprising:
   a first layer configured to detect the at least one of actinic radiation or non-actinic radiation; and
   a second layer comprising silk.

2. The flat panel detector component of claim 1, wherein the second layer is in direct physical contact with the first layer.

3. The flat panel detector component of claim 1, wherein the first layer comprises amorphous selenium.

4. The flat panel detector component of claim 1, comprising:
   a third layer comprising silk, the first layer disposed between the second layer and the third layer.

5. The flat panel detector component of claim 1, wherein the second layer is configured to filter electrical charge generated at the first layer.

6. The flat panel detector component of claim 1, comprising:
   a third layer comprising a liquid crystal, the second layer disposed between the first layer and the third layer.

7. The flat panel detector component of claim 6, comprising:
   a fourth layer comprising silk; and
   a fifth layer comprising glass, the fourth layer disposed between the third layer and the fifth layer.

8. The flat panel detector component of claim 1, wherein the silk is arranged within the second layer according to a specified pattern.

9. The flat panel detector component of claim 1, wherein the flat panel detector component is configured for use in a liquid crystal apparatus.

10. A method for forming a flat panel detector component used to detect at least one of actinic radiation or non-actinic radiation, comprising:
    forming a second layer adjacent a first layer, the first layer configured to detect the at least one of actinic or non-actinic radiation and the second layer comprising silk.

11. The method of claim 10, the forming comprising:
    depositing the silk onto the first layer to form the second layer.

12. The method of claim 10, comprising:
    forming a third layer adjacent the second layer, the third layer comprising a liquid crystal.

13. The method of claim 12, comprising:
    forming a combination comprising a fourth layer and a fifth layer, the fourth layer comprising silk and the fifth layer comprising glass; and
    applying the combination to the third layer such that the fourth layer is disposed between the third layer and the fifth layer.

14. The method of claim 10, the forming comprising:
    forming a pattern in the second layer.

15. The method of claim 10, the forming comprising forming the second layer to function as at least one of:
    an insulating layer;
    a blocking layer;
    a separation layer; or
    a patterning layer.

16. An apparatus for detecting x-rays, comprising:
    a first layer configured to detect the x-rays; and
    a second layer comprising silk, the second layer adjacent the first layer.

17. The apparatus of claim 16, wherein the first layer comprises one or more of:
    amorphous selenium;
    a lead oxide;
    cadmium selenide;
    cadmium telluride
    mercury iodide;
    cadmium zinc telluride;
    lead iodide;
    titanium tetrabromide; or
    an x-ray detector particle in binder.

18. The apparatus of claim 16, comprising a third layer comprising liquid crystal.

19. The apparatus of claim 16, the second layer forming an N-type blocking layer.

20. The apparatus of claim 16, the second layer forming a P-type blocking layer.

* * * * *